United States Patent Office 3,752,791
Patented Aug. 14, 1973

3,752,791
PROCESS FOR THE PRODUCTION OF POLYAMIDE IMIDES BY REACTING POLYCARBONAMIDE WITH ALIPHATIC DIISOCYANATE AND CYCLIC DICARBOXYLIC ACID ANHYDRIDE
Wilfried Zecher, Cologne, and Rudolf Merten, Leverkusen, Germany, assignors to Bayer Aktiengesellschaft, Leverkusen, Germany
No Drawing. Filed Oct. 23, 1970, Ser. No. 83,637
Claims priority, application Germany, Nov. 11, 1969,
P 19 56 512.9
Int. Cl. C08g 20/38
U.S. Cl. 260—78 SC          9 Claims

ABSTRACT OF THE DISCLOSURE

The invention relates to a process which comprises reacting a polyamide with a polyisocyanate having at least two NCO groups, or a compound capable of reacting as such a polyisocyanate under the reaction conditions, and a cyclic dicarboxylic acid anhydride which contains at least one additional group capable of condensation or addition, or a compound capable of forming such an anhydride under the reaction conditions, at a temperature of from —20 to +450° C. Predominantly, high molecular weight reaction products, distinguished by their outstanding solubility, are obtained.

---

This invention relates to a process for the production of polyamide imides by reacting polyamides, acid anhydrides and isocyanates.

It is known that polyamide imides can be obtained by reacting an aliphatic or aromatic diamine with a dicarboxylic acid anhydride carboxylic acid chloride, for example trimellitic acid anhydride chloride. One disadvantage of this process is that the hydrogen chloride has to be neutralised by the addition of acid acceptors, and the resultant hydrochloride salts subsequently affect the polymer and can only be removed by difficult, laborious purifying operations, which in many instances result in a deterioration in the mechanical properties through dissociation or rearrangement reactions.

The polyamide imides are used, for example, as lacquers and insulating films in electrical engineering, because many materials of this type are distinguished by their outstanding thermal stability.

It is an object of this invention to provide a process for the production of polyamide imides which avoids the above-mentioned disadvantages.

This object is accomplished by a process which comprises reacting (a) a polyamide, with
(b) a polyisocyanate having at least two NCO groups, or a compound capable of reacting as such as polyisocyanate under the reaction conditions, and
(c) a cyclic dicarboxylic acid anhydride which contains at least one additional group capable of condensation or addition, or a compound capable of forming such an anhydride under the reaction conditions, at a temperature of from —20 to +450° C.

In this way, it is possible to obtain, for example, high molecular weight polyamide imides which, in addition to groups of the formula:

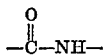

contain groups of the general formulae:

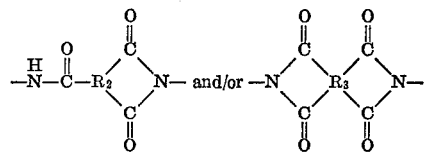

in which $R_2$ represents a trivalent and $R_3$ a tetravalent organic radical, which are attached to one another by radicals $R_1$ and $R_4$ which have valencies of at least 2, $R_1$ being the at least bivalent radical left by removal of the NCO groups from an organic polyisocyanate, and $R_4$ being the bivalent radical which link the —CO— and the —NH— groups to one another in the polyamide used.

The process according to the invention is explained by way of example by the following reaction scheme:

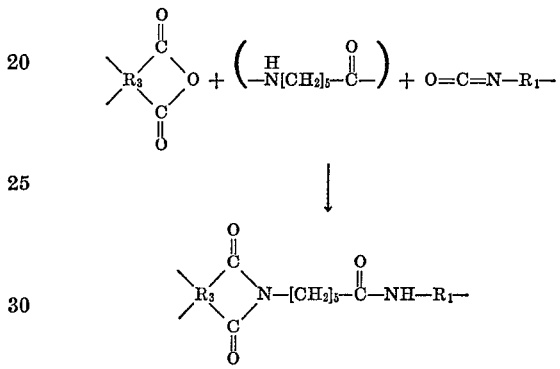

The process according to the invention eliminates serious disadvantages attending conventional methods for the production of polyamide imides. Since only carbon dioxide is formed as low molecular weight reaction product, there is no need for the hitherto-necessary working-up operations which, apart from the technical outlay they involve, are often accompanied by chain cleavage and hence by some deterioration in the mechanical properties. Polyisocyanates, which in most instances can be purified by distillation, are used instead of the previously employed oxidation-sensitive amines, which in many instances are extremely difficult to purify. By modifying the reaction times and temperatures and the stoichiometric ratios, the process makes it possible to obtain polyamide imides whose properties can be varied within wide limits in dependence both upon composition and upon molecular weight. In contrast to the reaction of isocyanates with acid anhydrides, secondary reactions occur only to a very limited extent, and predominantly high molecular weight reaction products, distinguished by their outstanding solubility, are obtained.

When at least bifunctional isocyanates and bifunctional acid anhydrides are used as starting materials, the only bonds present in the end product are those through amide and imide groups. However, the high molecular weight compounds can also be prepared using one monofunctional and one bifunctional, or two monofunctional, components which in this instance must contain at least one other group capable of condensation or addition.

In another embodiment, other polyfunctional substances, for example diamines, polyesters or ethers with terminal acid groups, diols, triols, amino alcohols and polycarboxylic acids, can be added after the actual reaction. These substances subsequently react with the reactive terminal groups in the condensation products obtained by the reaction according to the invention, accompanied by chain extension or crosslinking.

Polyamides suitable for use in the process according to the invention include any polyamides of the kind obtainable by polycondensing dicarboxylic acids or their derivatives with diamines, or aminocarboxylic acids and their derivatives, for example lactams.

Polyamides with the following recurring structural units are mentioned by way of example:

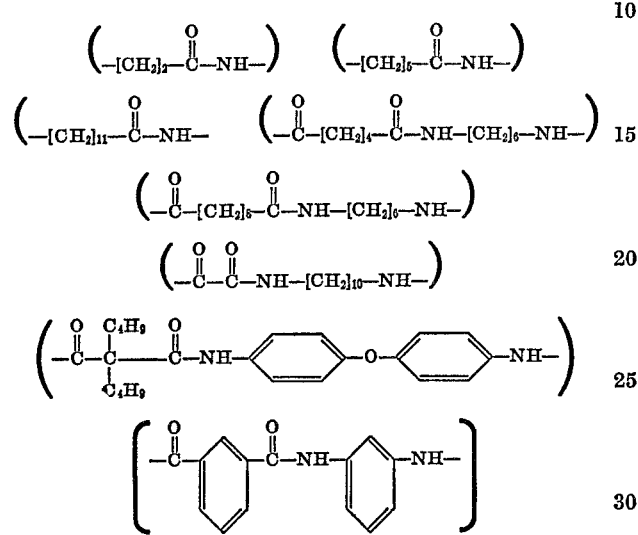

It is preferred to use polyamide-6 and polyamide-66. Suitable cyclic dicarboxylic acid anhydrides containing at least one other group capable of condensation or addition include those cyclic dicarboxylic acid anhydrides which, in addition to the anhydride group, contain, for example, another cyclic anhydride group, a carboxyl group, a sulphonic acid group or a hydroxyl group.

The following compounds are mentioned by way of example:

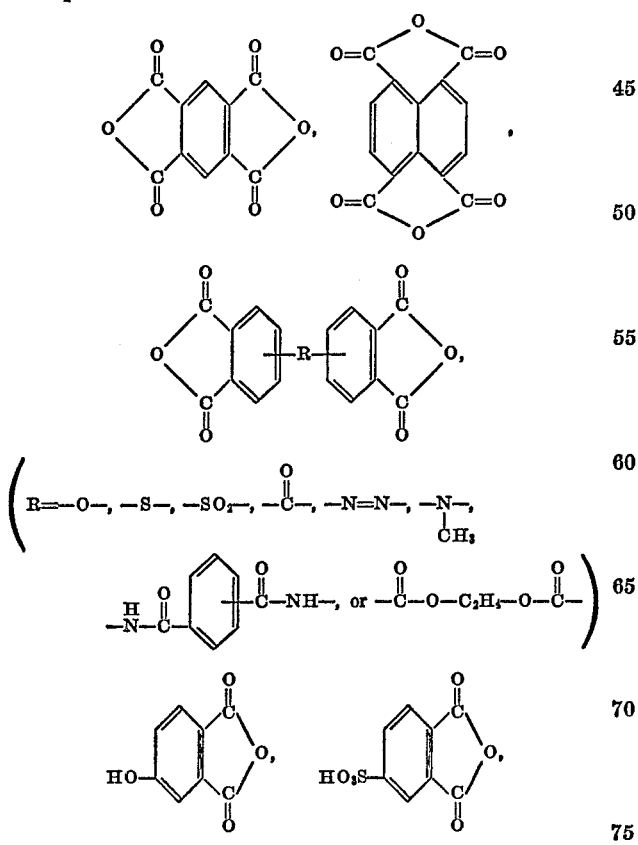

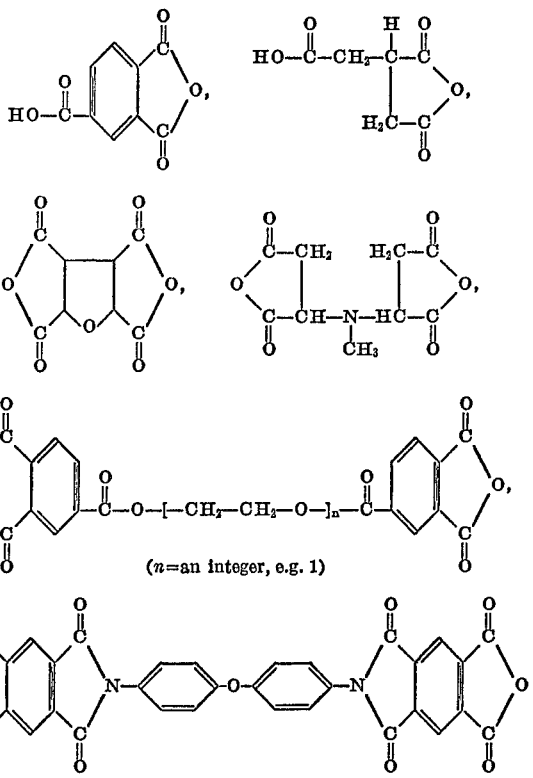

($n$=an integer, e.g. 1)

Other suitable starting materials include oligomeric or polymeric compounds with acid anhydride groups, of the kind that can be obtained, for example, by the polymerization of maleic acid anhydride with styrene or ethylene, or by condensing isocyanates with excess acid anhydride.

Instead of the cyclic dicarboxylic acid anhydrides, it is also possible to use compounds of the kind which, like o-dicarboxylic acids or their phenyl esters, for example, can be converted into acid anhydrides during the reaction.

It is preferred to use trimellitic acid anhydride, pyromellitic acid anhydride, cyclopentane tetracarboxylic acid anhydride and tetrahydrofuran tetracarboxylic acid anhydride.

Any organic polyisocyanate containing at least two NCO groups in the molecule may be used as polyisocyanate in the process according to the invention.

The following are mentioned by way of example:

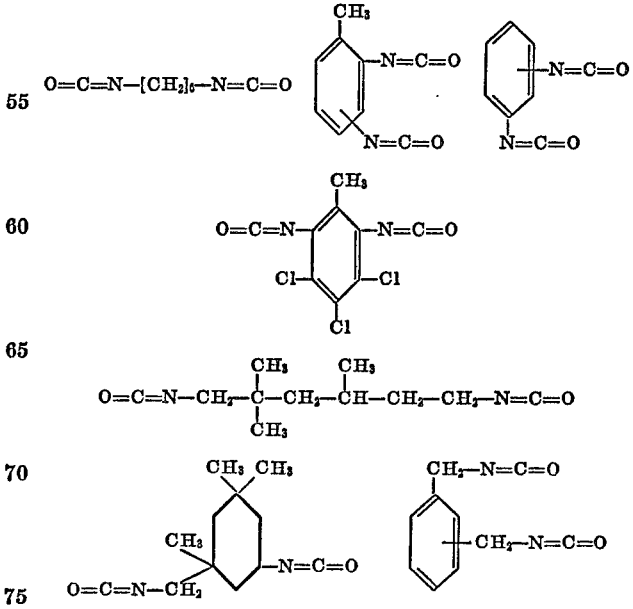

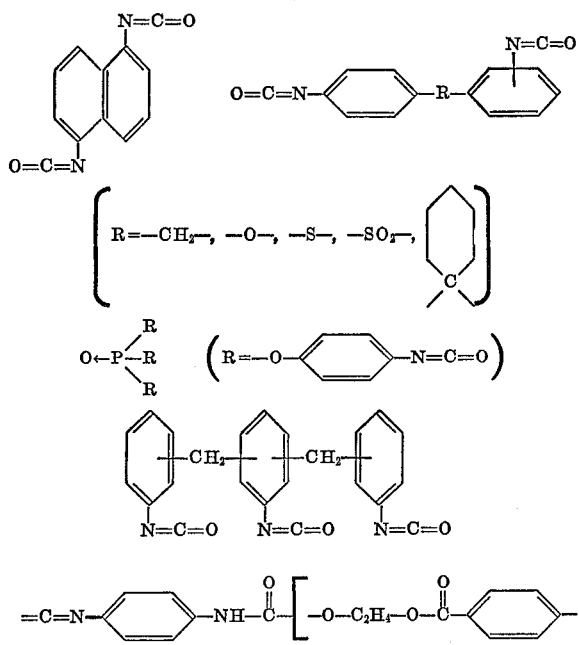

Other suitable isocyanates include polymerisation or polycondensation products containing isocyanate groups, for example polyesters, polyamides, polyimides, polyhydantoins, polyureas or polyurethanes, which contain at least two isocyanate radicals as terminal groups or in the chain.

4,4'-diisocyanato-diphenylmethane, tolylene-2,4- or 2,6-diisocyanate and hexamethylene diisocyanate are preferably used.

Instead of the isocyanates, it is also possible to use masked isocyanates, for example the addition products of phenols with isocyanates, hydrocyanic acid and CH-acid compounds, for example acetoacetic esters. Other suitable starting materials include derivatives of isocyanates which, like ureas and alkyl carbamic acid esters, can be reacted with cyclic acid anhydrides to form imides and with carboxylic acids to form amides.

The reaction according to the invention can be carried out in solvents which, under the reaction conditions, do not react with the components, or only form loose addition compounds or compounds which react further. Suitable solvents include hydrocarbons, halohydrocarbons, phenols, esters, ketones, ethers, substituted amides, sulphoxides and sulphones, for example xylene, o-dichlorobenzene, phenol, cresol, actophenone, ethylene glycol monomethyl ether acetate, diethylene glycol dimethyl ether, N-methyl pyrrolidone, dimethyl formamide, dimethyl sulphoxide, dimethyl sulphone and mixtures thereof. It is preferred to use cresol and dimethyl acetamide.

The process according to the invention is generally carried out by reacting the reaction components, optionally in the presence of a solvent, for a period ranging from a few minutes to several hours at a temperature of from —20 to +450° C. and preferably at a temperature of from +20 to +280° C. The progress of the reaction can be followed through the evolution of carbon dioxide. In some instances, it is of advantage to carry out the reaction in several stages. Nitrogen, argon and carbon dioxide may be used as inert protective gases.

As a rule, the quantitative ratios in which the reaction components are used are such that equivalence exists between the reactive groups, although appreciable deviations are also possible. Thus, the ratio of amide to imide groups can be varied by modifying the polyamide component, whilst it is possible, by using an excess of anhydride or isocyanate, to obtain products with reactive terminal groups which can be further reacted. From the working examples it can be seen that molar ratios of repeating unit of the polyamide; polyisocyanate; to cyclic anhydride, (A:B:C) in the range .25:1:1 to 4:1:1 are specifically intended.

The reaction can be accelerated by suitable catalysts, for example by phosphoric acid, phosphorous acid, boric acid, boron fluoride, carboxylic acids, zinc chloride, ferric chloride, cobalt acetate, triethylene diamine, phenylmethyl phospholine oxide, trialkyl phosphine, zinc octoate, dialkyl tin diacylates, titanium tetrabutylate, lead oxide or antimony oxide.

It is possible, by virtue of the process according to the invention, to obtain polyamide imides which are distinguished by their outstanding resistance to high temperatures and which are suitable for use as heat-resistant plastics, for example as lacquers, foams and mouldings. They may also be mixed for various applications with fillers, pigments and low molecular weight or high molecular weight components, for example for the production of wire enamels with polyesters, polyurethanes and polyhydantoins.

The following examples are to further illustrate the invention without limiting it.

EXAMPLE 1

125 g. (0.5 mol) of 4,4'-diisocyanato-diphenylmethane, 56.6 g. of polycaproic acid amide with a relative solution viscosity $\eta_{rel}$ of 2.95, as measured on a 1% by weight solution in m-cresol at 25° C. and 96 g. (0.5 mol) of trimellitic acid anhydride are introduced into 260 g. of a commercial cresol mixture. The mixture is then heated until condensation accompanied by the evolution of carbon dioxide begins at around 110° C., after which the temperature is increased over a period of some 6 hours to 200° C. proportionally to the amount of gas given off. The reaction mixture initially turns hazy, changing into a clear solution at 200° C. It is then stirred for 2 hours at 200° C., after which the temperature is increased to a value from 225 to 230° C. after a distillation bridge has been fitted, approximately 210 g. of cresol being distilled off. Condensation is continued for 1 hour at this temperature, after which the temperature is allowed to fall to 200° C. and the cresol which has distilled off is reintroduced as solvent. A clear solution of the polyamide imide is obtained. The viscosity of a sample, diluted with cresol in a ratio of 2:1 to form an approximately 16% by weight solution, amounts to 990 cp. at 25° C. Another sample is diluted with cresol to form a 30% by weight solution, and stoved on a metal plate initially at 200° C. and then at 300° C. to form a clear elastic film.

*Analysis.*—Calculated (percent): C, 71.9; H, 5.4; N, 90. Found (percent): C, 71.5; H, 5.1; N, 8.6.

The infra-red spectrum contains the following characteristic bands:

Imide: 1723 and 1776 cm.$^{-1}$.
Amide: around 1670 cm.$^{-1}$—wide band.

The procedures on which Examples 2 to 11 are based are the same as in Example 1.

EXAMPLE 2

56.6 g. of hexamethylene/adipic acid amide ($\eta_{rel}$=2.75, measured as in Example 1, 125 g. (0.5 mol) of 4,4'-diisocyanatodiphenylmethane and 96 g. (0.5 mol) of trimellitic acid anhydride are reacted in 260 g. of cresol. A clear solution which, after dilution to a solids content of 16% by weight, has a viscosity of 1705 cp. at 25° C. is obtained.

A 25% by weight solution of the polyamide imide is coated onto a glass plate and, after stoving at 200 and 300° C., gives an elastic tough film.

N: Calculated: 9.0%. Found: 8.8%.

IR: Imide: 1720 and 1778 cm.$^{-1}$; amide: wide around 1660 cm.$^{-1}$.

EXAMPLE 3

125 g. (0.5 mol) of 4,4'-diisocyanato-diphenylmethane, 28.3 g. of polycaproic acid amide $$(\eta_{rel}^{25}=2.95)$$

and 96 g. (0.5 mol) of trimellitic acid anhydride are condensed in 260 g. of cresol to form the polyamide imide.

Viscosity of a 16% by weight solution in cresol at 25° C: 753 cp.

A 35% by weight solution is stoved on a wire at 300 to 400° C. to form a lacquer film.

N: Calculated: 8.5%. Found: 8.4%.

IR: Imide: 1723 and 1776 cm.$^{-1}$; amide: around 1670 cm.$^{-1}$—wide band.

EXAMPLE 4

52.5 g. (0.25 mol) of cyclopentane tetracarboxylic acid dianhydride, 43.5 g. of tolylene-2,4-diisocyanate and 56.6 g. of polycaproic acid amide ($\eta_{rel}=2.95$) are condensed in 150 g. of cresol, in the final stage for 3 hours at 225° C. The solution is diluted to 30% by weight, applied to a glass plate and stoved at 200 to 300° C. to form an elastic film.

IR: Imide: 1733 and 1775 cm.$^{-1}$; amide: wide shoulder at 1650–1680 cm.$^{-1}$.

EXAMPLE 5

113.2 g. of polycaproic acid amide $$(\eta_{rel}^{25}=2.95)$$

125 g. (0.5 mol) of 4,4'-diisocyanato-diphenylmethane and 96 g. (0.5 mol) of trimellitic acid anhydride are reacted in 260 g. of cresol. The viscosity of a sample diluted to a solids content of 16% by weight is 1565 cp. at 25° C. The main component is diluted to a solids content of 30% by weight, applied to a metal plate and stoved at 220 to 300° C. to form an elastic lacquer film.

N: Calculated: 9.7%. Found: 9.3%.

IR: Imide: 1720 and 1775 cm.$^{-1}$; amide: 1650–1660 cm.$^{-1}$.

EXAMPLE 6

28.3 g. of hexamethylene/adipic acid amide ($\eta_{rel}=2.75$), 125 g. (0.5 mol) of 4,4'-diisocyanato-diphenylmethane and 96 g. (0.5 mol) of trimellitic acid anhydride are condensed in 260 g. of cresol, the temperature in the final stage being kept at 230° C. for a period of 3 hours. A light brown solution is obtained with a viscosity (following dilution to a solids content of 16% by weight) of 682 cp. A 25% by weight solution of the polyamide imide is applied to a glass plate and stoved at 210 and 330° C. to form an elastic film.

N: Calculated: 8.5%. Found: 8.4%.

IR: Imide: 1730 and 1780 cm.$^{-1}$; amide: around 1670 cm.$^{-1}$.

EXAMPLE 7

84 g. (0.5 mol) of hexamethylene diisocyanate, 113.2 g. of polycaproic acid amide $$(\eta_{rel}^{25}=2.95)$$

and 96 g. (0.5 mol) of trimellitic acid anhydride are condensed in 300 g. of cresol. The reaction product, a viscous solution, is diluted with cresol to a solids content of 25% by weight, applied to copper wire and stoved at an oven temperature of 270° C. to form an elastic lacquer film.

IR: Imide: 1715 and 1770 cm.$^{-1}$; amide: 1640 cm.$^{-1}$.

EXAMPLE 8

226 g. of hexamethylene/adipic acid amide $$(\eta_{rel}^{25}=2.75)$$

250 g. (1 mol) of 4,4'-diisocyanato-diphenylmethane and 192 g. (1 mol) of trimellitic acid anhydride are condensed in 300 g. of cresol.

The viscosity of a sample of the polyamide imide, diluted to a solids content of 16% by weight, amounts to 3122 cp. at 25° C. A 25% by weight solution is applied to a glass plate and stoved at 200 and 280° C. to form a film.

IR: Imide: 1720 and 1778 cm.$^{-1}$; amide: 1650 cm.$^{-1}$.

EXAMPLE 9

87.1 g. (0.5 mol) of tolylene-2,4-diisocyanate, 56.6 g. of polycaproic acid amide $$(\eta_{rel}^{25}=2.95)$$

and 96 g. (0.5 mol) of trimellitic acid anhydride are reacted in 235 g. of phenol. The reaction mixture, a clear solution, is applied to a metal plate and stoved at 260° C. to form a lacquer film.

IR: Imide: 1730 and 1775 cm.$^{-1}$; amide: wide around 1670 cm.$^{-1}$.

EXAMPLE 10

53.0 g. (0.25 mol) of tetrahydrofuran/tetracarboxylic acid dianhydride, 42 g. (0.25 mol) of hexamethylene diisocyanate and 113.2 g. of polycaproic acid amide $$(\eta_{rel}^{25}=2.95)$$

are condensed in a mixture of 170 g. of phenol and 170 g. of cresol. A viscous solution is obtained, is diluted to a solids content of 30% by weight with cresol/phenol and stoved on a glass plate at 260° C.

IR: Imide: 1710 and 1750 cm.$^{-1}$; amide: 1655 cm.$^{-1}$.

EXAMPLE 11

109 g. (0.5 mol) of pyromellitic acid dianhydride, 84 g. (0.5 mol) of hexamethylene diisocyanate and 113.2 g. of polycaproic acid amide $$(\eta_{rel}^{25}=2.95)$$

are reacted in 300 g. of cresol. The reaction mixture is taken up in dimethyl formamide and filtered. After drying, the polyamide imide is obtained in the form of a light brown solid substance.

$[C_{28}H_{36}N_4O_6]_n$ (524.6)$_n$: Calculated: N, 10.7%. Found: N, 10.4%.

What we claim is:

1. A process for the production of high molecular weight film-forming polyamide imide which comprises concurrently reacting (A) a synthetic film-forming linear polycarbonamide; with
   (B) an aliphatic diisocyanate or a compound capable of reacting as such a diisocyanate under the reaction conditions; and
   (C) a cyclic dicarboxylic acid anhydride or a compound capable of forming a cyclic dicarboxylic anhydride under the reaction conditions and which contains at least one group capable of condensation with (A) or (B);

in which the molar ratio of (the repeating carbonamide unit of (A):(B):(C) is 0.25:1:1 to 4:1:1.

2. The process as claimed in claim 1, wherein the temperature is from +20 to +280° C.

3. The process as claimed in claim 1, wherein reaction is carried out in the presence of an inert solvent.

4. The process as claimed in claim 3, wherein the solvent is a hydrocarbon, halohydrocarbon, phenol, ester, ketone, ether, substituted amide, sulphoxide or sulphone.

5. The process as claimed in claim 4, wherein the solvent is cresol or dimethyl acetamide.

6. The process of claim 1 in which the group of (C) capable of condensation with (A) or (B) is a cyclic anhydride, a group capable of forming a cyclic anhydride group under the reaction conditions or carboxyl.

7. The process as claimed in claim 1, wherein the polyamide (a) is polycaproamide or polyhexamethylene adipamide.

8. The process as claimed in claim 1, wherein component (B) is selected from the group consisting of 4,4′-diisocyanato-diphenylmethane, tolylene-2,4- or -2,6-diisocyanate, or hexamethylene diisocyanate.

9. The process of claim 1 in which the molar ratio of (A):(B):(C) is 0.25:1:1 to 4:1:1 in which the molar ratio of (A) is based on the molecular weight of the recurring carbonamide unit.

References Cited

UNITED STATES PATENTS

| | | | |
|---|---|---|---|
| 2,333,914 | 11/1943 | Berchet | 260—78 S C |
| 2,557,808 | 6/1951 | Walker | 260—78 S C |
| 2,863,857 | 12/1958 | Costain | 260—78 T F |
| 3,020,251 | 2/1962 | Russell | 260—78 S C |

HAROLD D. ANDERSON, Primary Examiner

U.S. Cl. X.R.

260—18 N, 33.4 R, 47 CZ, 78 A, 78 L, 78 TF